United States Patent
Miao

(10) Patent No.: US 11,054,726 B2
(45) Date of Patent: Jul. 6, 2021

(54) PICO PROJECTOR AND CONTROL METHOD THEREFOR

(71) Applicant: Coretronic Corporation, Hsin-Chu (TW)

(72) Inventor: Yun-Lin Miao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/885,256

(22) Filed: May 27, 2020

(65) Prior Publication Data

US 2020/0379322 A1 Dec. 3, 2020

Related U.S. Application Data

(60) Provisional application No. 62/853,724, filed on May 29, 2019.

(30) Foreign Application Priority Data

Oct. 24, 2019 (CN) .......................... 201911015584.9

(51) Int. Cl.
| | | |
|---|---|---|
| *G03B 21/28* | (2006.01) | |
| *G03B 21/14* | (2006.01) | |
| *F21S 41/16* | (2018.01) | |
| *F21S 41/141* | (2018.01) | |
| *F21S 41/67* | (2018.01) | |

(52) U.S. Cl.
CPC .......... *G03B 21/14* (2013.01); *F21S 41/141* (2018.01); *F21S 41/16* (2018.01); *F21S 41/67* (2018.01); *G03B 21/28* (2013.01)

(58) Field of Classification Search
CPC ...... G03B 21/008; G03B 21/16; G03B 21/28; G03B 21/208; G03B 21/2013; G03B 21/2033; H04N 9/315; H04N 9/3141; H04N 9/3155; H04N 9/3161; H04N 9/3164;
(Continued)

(56) References Cited

U.S. PATENT DOCUMENTS

| 5,768,007 A | 6/1998 | Knipe et al. |
|---|---|---|
| 2015/0194100 A1 | 7/2015 | Hada |

(Continued)

FOREIGN PATENT DOCUMENTS

| CN | 106066563 | 11/2016 |
|---|---|---|
| CN | 107272316 | 10/2017 |
| JP | 5098658 | 12/2012 |

OTHER PUBLICATIONS

"Search Report of Europe Counterpart Application", dated Sep. 16, 2020, p. 1-p. 8.

(Continued)

*Primary Examiner* — Sultan Chowdhury
(74) *Attorney, Agent, or Firm* — JCIPRNET

(57) ABSTRACT

A pico projector and a control method of the pico projector are provided. The pico projector is installed on a door of a vehicle and includes a light source, a DMD, a projection lens, a power supply unit, and a processing circuit. The processing circuit receives a shutdown warning signal, transmits a parking signal to the DMD to perform a parking operation on the DMD, and notifies the power supply unit of cutting off a first power provided to the DMD after a predetermined time interval from transmitting the parking signal.

19 Claims, 5 Drawing Sheets

(58) Field of Classification Search
CPC ........ H04N 9/3179; F21S 41/12; F21S 41/16; F21S 41/67; F21S 41/141; F21S 41/147
See application file for complete search history.

(56) References Cited

U.S. PATENT DOCUMENTS

2017/0285450 A1* 10/2017 Furihata .................. G02B 7/14
2018/0364474 A1   12/2018 Honma et al.

OTHER PUBLICATIONS

Texas Instruments, "DLP9000 Family of 0.9 WQXGA Type A DMDs," Oct. 2016, pp. 1-58.
Benjamin Lee, "Introduction to ±12 Degree Orthogonal Digital Micromirror Devices (DMDs)," Texas Instruments, Feb. 2018, pp. 1-13.

* cited by examiner

PICO PROJECTOR AND CONTROL METHOD THEREFOR

CROSS-REFERENCE TO RELATED APPLICATION

This application claims the priority benefit of U.S. provisional application Ser. No. 62/853,724, filed on May 29, 2019 and China patent application serial no. 201911015584.9, filed on Oct. 24, 2019. The entirety of each of the above-mentioned patent applications is hereby incorporated by reference herein and made a part of this specification.

BACKGROUND OF THE INVENTION

Field of the Invention

The invention relates to a projector and a control method therefor; more particularly, the invention relates to a pico projector and a control method therefor capable of increasing the reliability of the pico projector.

Description of Related Art

The welcome light on the door of the existing vehicle may project an illumination beam and a logo beam from the door to the ground. When the door is opened, the light is displayed on the ground, and when the door is closed, the light is turned off. The internal architecture of these designs mostly adopts light-emitting diodes (LEDs) as light sources, or a logo mask is placed on the LED, so as to display the patterned light on the ground.

If the welcome light can be projected to display different patterns and can even be applied to play animations or movies, the welcome light must be designed to include a pico projector. However, at present, the power supply of the vehicle is designed to supply power to the welcome light when it is detected that the door of the vehicle is opened, and the power supplied to the welcome light is cut off when the door is detected to be turned off. Since the power supplied to the pico projector is frequently turned on or off, each micromirror on each digital micromirror device (DMD) is not in a flat-state when the door is opened or closed. This may cause damages to the DMD inside the pico projector and reduce the reliability of the pico projector installed on the door of the vehicle.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be solved by one or more embodiments of the invention were acknowledged by people of ordinary skill in the pertinent art.

SUMMARY OF THE INVENTION

The invention provides a pico projector and a control method therefor to capable of improving the reliability of the pico projector installed on a door of a vehicle.

Other advantages can be further illustrated by the technical features broadly embodied and described as follows.

In order to achieve one or a portion of or all of the objectives or other objectives, an embodiment of the invention provides a pico projector installed on a door of a vehicle and including a light source, a digital micromirror device (DMD), a projection lens, a power supply unit, and a processing circuit. Here, the light source is configured to provide an illumination beam, the DMD is disposed on a propagation path of the illumination beam and configured to convert the illumination beam into an image beam, the projection lens is disposed on a propagation path of the image beam and configured to project the image beam to the outside of the pico projector, the power supply unit is coupled to the light source and the DMD, and the processing circuit is coupled to the power supply unit and the DMD. The processing circuit receives a shutdown warning signal and transmits a parking signal to the DMD, so as to perform a parking operation on the DMD. After the processing circuit transmits the parking signal, the processing circuit notifies the power supply unit of cutting off a first power supplied to the DMD after a predetermined time interval.

To achieve one, part, or all of the foregoing purposes or other purposes, an embodiment of the invention provides a control method for a pico projector. The pico projector is installed on a door of a vehicle and includes a light source, a DMD, a projection lens, a power supply unit, and a processing circuit. The power supply unit is coupled to the light source, the DMD, and the processing circuit. The processing circuit is coupled to the DMD, and the control method for the pico projector includes: providing an illumination beam by the light source, converting the illumination beam to an image beam by the DMD disposed on a propagation path of the illumination beam, projecting the image beam to the outside of the pico projector by the projection lens disposed on a propagation path of the image beam, and receiving a shutdown warning signal by the processing circuit and transmitting the parking signal to the DMD, so as to perform a parking operation on the DMD; after transmitting the parking signal, the power supply unit is notified of cutting off a first power supplied to the DMD after a predetermined time interval.

Based on the above, in the pico projector and the control method therefor as provided in one or more embodiments of the invention, when the processing circuit receives the shutdown warning signal, the parking signal is transmitted to the DMD of the pico projector, so as to perform the parking operation on the DMD; after the parking signal is transmitted, the power supply unit is notified of cutting off the power supplied to the DMD after the predetermined time interval, so that the DMD has sufficient time for the parking operation and is not easily damaged. The shutdown warning signal may be generated according to the transducer detecting that the door of the vehicle is being closed, may be generated according to a voltage attenuation of an input voltage of the pico projector greater than a predetermined percentage, or may be received after a central control system of the vehicle determines that the door of the vehicle is closed. After receiving the shutdown warning signal, the pico projector may notify the power supply unit of cutting off the point power supply provided to the light source of the pico projector source and/or the transducer to save power. In addition, the power supply unit of the pico projector may further include at least one capacitor corresponding to the input voltage and an output voltage. As such, the DMD has more time to complete the parking operation before the power is turned off, so as to avoid damages to the DMD.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
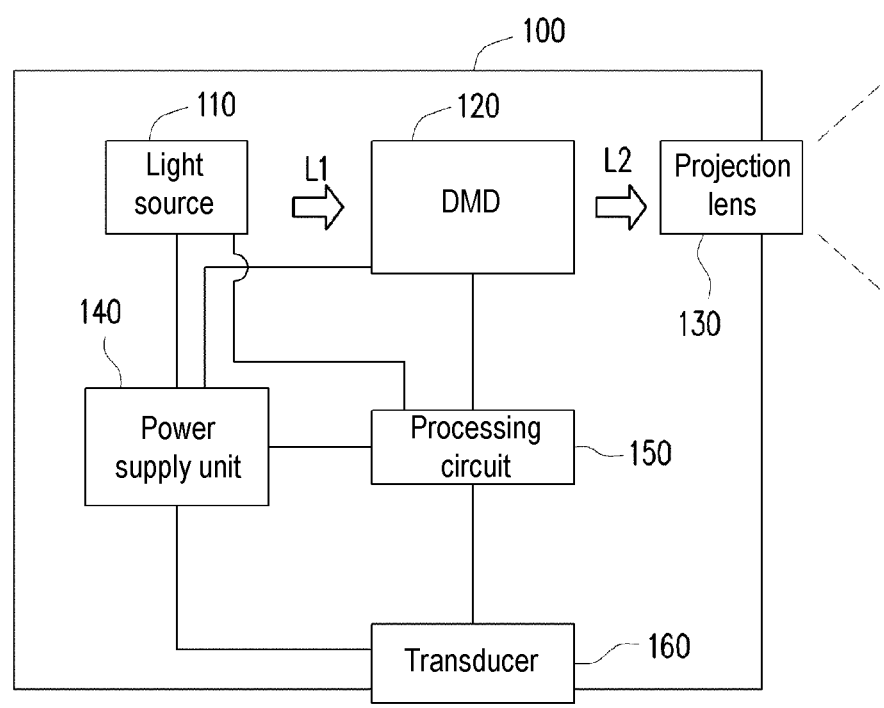
FIG. 1 is a block diagram of a pico projector according to an embodiment of the invention.

FIG. 1 is a block diagram of a pico projector 100 according to an embodiment of the invention. With reference to FIG. 1, the pico projector 100 provided in an embodiment of the invention may be installed on a door of a vehicle and project an image downward to the ground when the door is opened. The pico projector 100 includes a light source 110, a digital micromirror device (DMD) 120, a projection lens 130, a power supply unit 140, and a processing circuit 150. The light source 110 provides an illumination beam L1. The DMD 120 is disposed on a propagation path of the illumination beam L1 and converts the illumination beam L1 to an image beam L2. The projection lens 130 is disposed on a propagation path of the image beam L2 and projects the image beam L2 to the outside of the pico projector 100. The power supply unit 140 is coupled to the light source 110 and the DMD 120. The processing circuit 150 is coupled to the light source 110, the DMD 120, and the power supply unit 140.

The light source 110 may include a plurality of visible light-emitting elements, a plurality of non-visible light-emitting elements, or a combination thereof. The visible light-emitting elements may include but are not limited to light-emitting diodes (LEDs) or laser diodes (LDs). The number of the DMDs 120 may be one or more, and the detailed steps and implementation manners corresponding to the different numbers of the DMDs 120 may be sufficiently taught or suggested by the general knowledge associated with the pertinent field and therefore will not be described again. The projection lens 130 is, for instance, a combination of one or more optical lenses having a diopter, such as a biconcave lens, a biconvex lens, a concave-convex lens, a convex-concave lens, a plano-convex lens, a plano-concave lens, any other non-planar lens, or a combination thereof. The type of the projection lens 130 is not limited herein.

The power supply unit 140 may include a transformator, a rectifier, a voltage regulator, another similar element, processing software, or control software, which should however not be construed as a limitation herein. The processing circuit 150 may be, for instance, a central processing unit (CPU) or another programmable general-purpose or special-purpose microprocessor, digital signal processor (DSP), programmable controller, application specific integrated circuit (ASIC), programmable logic device (PLD), another similar device, processing software, or control software, which should however not be construed as a limitation herein. For instance, the processing circuit 150 may include or may work with various storage devices and peripheral circuits.

The power supply unit 140 may provide a plurality of output voltages. Specifically, the power supply unit 140 may receive an input voltage of 12 volts (V) and output the required output voltages of 3.3V, 1.8V, 1.0V, 2.5V, etc., wherein the 2.5/1.8V output voltage may be provided to the DMD 120, and the 3.3/1.8/1.0V output voltage may be provided to the processing circuit 150. In an embodiment, the processing circuit 150 may include at least one of a micro controller unit (MCU), an ASIC, and a field programmable gate array (FPGA).

In an embodiment, the parking operation performed on the DMD 120 may include the first step to the fifth step below, and the first step to the fifth step may be performed on the pico projector shown in FIG. 1 and FIG. 4.

[First Step]

The processing circuit 150 receives a shutdown warning signal. That is, the processing circuit 150 may determine whether the door is being closed or is about to be closed through receiving the shutdown warning signal.

In an embodiment, the pico projector 100 includes a transducer 160 coupled to the processing circuit 150 and the power supply unit 140. When the transducer 160 detects that the door is closing, the transducer 160 transmits a shutdown warning signal to the processing circuit 150. The transducer 160 includes at least one of a distance transducer and an ambient light transducer, and the transducer 160 may be disposed on a light exit side of the pico projector 100 or near the car frame. Here, the distance transducer may detect and learn that the door is closing because the detected distance is being reduced, and the ambient light transducer may detect that the door is closing because the ambient light is being weakened. Preferably, the ambient light transducer may include a shielding structure to enhance the shading effect as within the scope of the car frame.

In another embodiment, the processing circuit 150 may include a voltage detection circuit configured to detect an input voltage of the power supply unit 140. The voltage detection circuit may be applied together with a voltage divider. When a voltage attenuation of the input voltage is greater than the predetermined percentage, the voltage detection circuit transmits the shutdown warning signal to the processing circuit 150. For instance, when the input voltage of the power supply unit 140 is 12V, and the voltage detection circuit detects that the input voltage is attenuated from 12V to 11V or below (e.g., the voltage attenuation is greater than a predetermined percentage of 8%), the voltage detection circuit transmits the shutdown warning signal to the processing circuit 150. In an embodiment, the vehicle has a central control system that provides an input voltage of 12V to the power supply unit 140.

In another embodiment, the central control system may detect that the door of the vehicle is closing, whereby the central control system may issue the shutdown warning signal to the processing circuit 150 via a vehicle communication interface (e.g., a communication interface 170) after the door is closed. Specifically, the central control system may detect that the door is closed and, after being notified of the closing of the door, transmit the shutdown warning signal to the processing circuit 150 through the vehicle communication interface. The vehicle communication interface is, for instance, a controller area network (CAN) bus, a universal asynchronous receiver/transmitter (UART), a local interconnect network (LIN), or any other similar interface.

By issuing the shutdown warning signal earlier, the pico projector 100 may obtain more time for performing the subsequent parking operation on DMD 120 before shut down. As such, the parking operation ensures that every digital micromirror on the DMD can be parked from an off-state or an on-state to a flat-state, and the reliability of the pico projector 100 may be increased to avoid damages to the DMD 120.

[Second Step]

After receiving the shutdown warning signal, the processing circuit 150 transmits a parking signal to the DMD 120 for performing the parking operation on the DMD 120. The parking signal is, for instance, a RESET_OEZ signal.

In the Second Step, in order to save power consumption, the processing circuit 150 may notify the power supply unit 140 of cutting off the power supplied to the light source 110 (or referred to as a second power) and notify the power supply unit 140 of cutting off the power supplied to the transducer 160 (or referred to as a third power).

In the Second Step, the light-emitting elements (e.g., LED elements) of the light source 110 stop receiving power supplied to a driver of the light source 110, thus causing the light-emitting elements of the light source 110 to stop providing the illumination beam L1.

[Third Step]

After the processing circuit 150 transmits the parking signal, the power supply unit 140 is notified of cutting off the power (or the first power) provided to the DMD 120 after the predetermined time interval, wherein the predetermined time interval is greater than one millisecond. For instance, the processing circuit 150 may transmit a power cutoff signal to the power of the DMD 120 after one millisecond from transmitting the parking signal, so that the micromirror of the DMD 120 has sufficient time for the parking operation before the power is turned off. That is, the difference between the start time point of the Third Step and the start time point of the Second Step is greater than one millisecond.

[Fourth Step]

The power of the DMD 120 pulls down the voltages (e.g., $V_{BIAS}$, $V_{OFFSET}$, $V_{RESET}$) received by a micro-electro-mechanical system (MEMS) corresponding to the DMD 120. The duration during which the Fourth Step is continuously carried out is approximately 300 microseconds.

In the Fourth Step, the processing circuit 150 transmits all power disabling signals to the power supply unit 140.

[Fifth Step]

The power supply unit 140 stops providing the output voltage. Therefore, the voltages (e.g., $V_{CC}/V_{REF}$) of the controller/integrated circuit (IC) corresponding to the DMD 120 are pulled down, and the parking operation performed on the DMD 120 is completed.

Through the above five steps, when the processing circuit 150 receives the shutdown warning signal provided by the transducer 160 or the shutdown warning signal provided by the central control system of the vehicle, the processing circuit 150 transmits a parking signal to the DMD 120 of the pico projector 100 to perform the parking operation on the DMD 120, and after the predetermined time interval from transmitting the parking signal, the power supply unit 140 is notified of cutting off the power supplied to the DMD 120, so that the DMD 120 has sufficient time for the parking operation and is not easily damaged.

Figure 2:
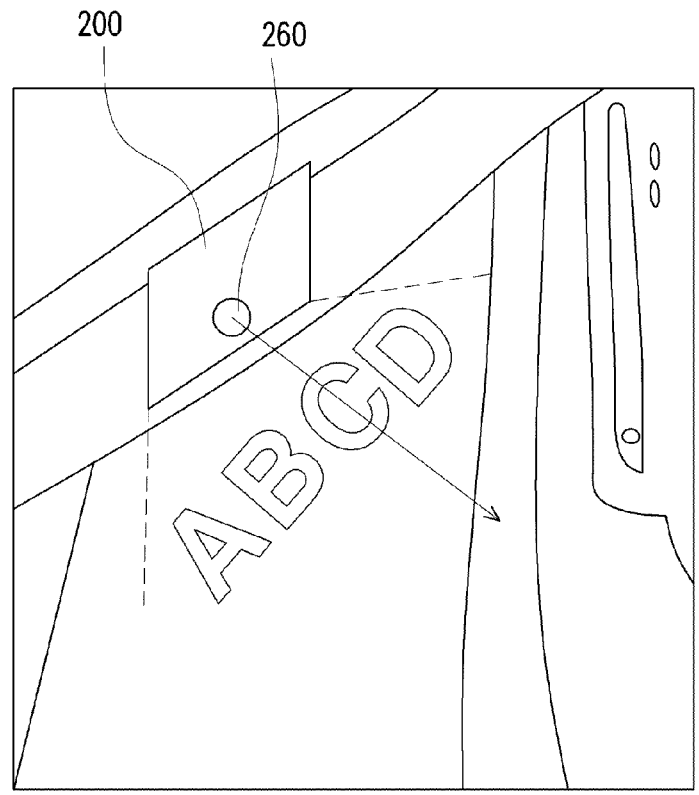
FIG. 2 exemplarily illustrates distance or light detection by a transducer of a pico projector according to an embodiment of the invention.

The specific manner in which the transducer 160 is configured may be referred to as what is illustrated in FIG. 2. FIG. 2 exemplarily illustrates distance or light detection by a transducer 260 of a pico projector 200 according to an embodiment of the invention. The pico projector 200 includes the transducer 260 to detect ambient light, wherein the pico projector 200 includes a shielding structure disposed around the transducer 260. Therefore, an image of "ABCD" may be projected onto the ground when the door of the vehicle is opened, and the transducer 260 may detect, for instance, the projection light or the ambient light bounced off the ground. When the door is closing, the surrounding shielding structure and the chassis of the vehicle (e.g., the car frame) may greatly block the lateral and front projection light or ambient light coming from the transducer 260; that is, the transducer 260 is shielded, so that the brightness of the ambient light detected by the transducer 260 is reduced, and the transducer 260 may transmit the shutdown warning signal to perform a shutdown procedure before the door of the vehicle is completely closed. Accordingly, the pico projector 200 stops projecting the image of "ABCD". On the other hand, the transducer 260 may be configured to detect a distance, such as detecting the distance between the door of the vehicle and the car frame or detecting the distance between the door of the vehicle and the ground. When the door is about to close, the distance between the transducer 260 and the chassis of the vehicle (such as the car frame) is significantly reduced, and the transducer 260 may transmit a shutdown warning signal to perform the shutdown procedure before the door is completely closed. Thus, the pico projector 200 stops projecting the image of "ABCD".

Figure 3:
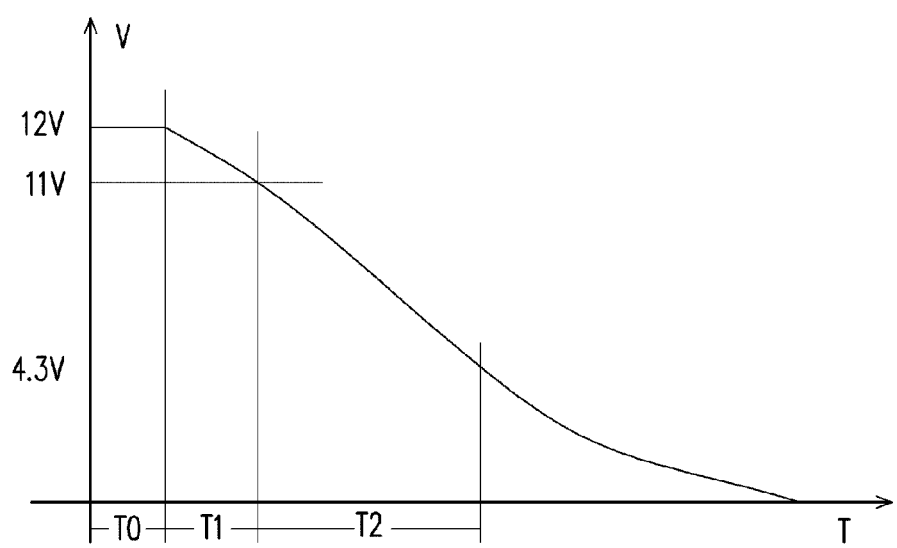
FIG. 3 is a schematic diagram illustrating an input voltage of a parking operation on a digital micromirror device (DMD) and a discharging operation during an elapsed time period according to an embodiment of the invention.

FIG. 3 is a schematic diagram illustrating an input voltage of a parking operation on the DMD 120 and a discharging operation during an elapsed time period according to an embodiment of the invention. With reference to FIG. 1 and FIG. 3 simultaneously, in an embodiment, the processing circuit 150 receives the shutdown warning signal from the central control system of the vehicle through an input interface 170 in advance at a start time point of a time interval T0. Therefore, before the input voltage is dropped to 4.3V, the pico projector 100 has a sum time interval of the time intervals T0, T1, and T2 for performing the parking operation on the DMD 120. Here, 3.3V is at least one of the input voltages of the processing circuit 150, which may be set to 3.3V plus 1V, so as to ensure that the processing circuit may still correctly process the signal within sufficient time for the parking operation.

In another embodiment, the processing circuit 150 obtains the shutdown warning signal at a start time point of a time interval T2 based on a voltage attenuation of the input voltage greater than a predetermined percentage (e.g., the input voltage is reduced from 12V to 11V). Therefore, before the input voltage is dropped to 4.3V, the pico projector 100 has the time interval T2 for performing the parking operation on the DMD 120. Preferably, the time interval T2 is greater than 1.3 milliseconds, and the pico projector 100 may perform the parking operation on the DMD 120. Here, 1.3 milliseconds are approximately equal to 1 millisecond required by the Second Step to the Fourth Step and 300 microseconds required by the Fourth Step.

Figure 4:
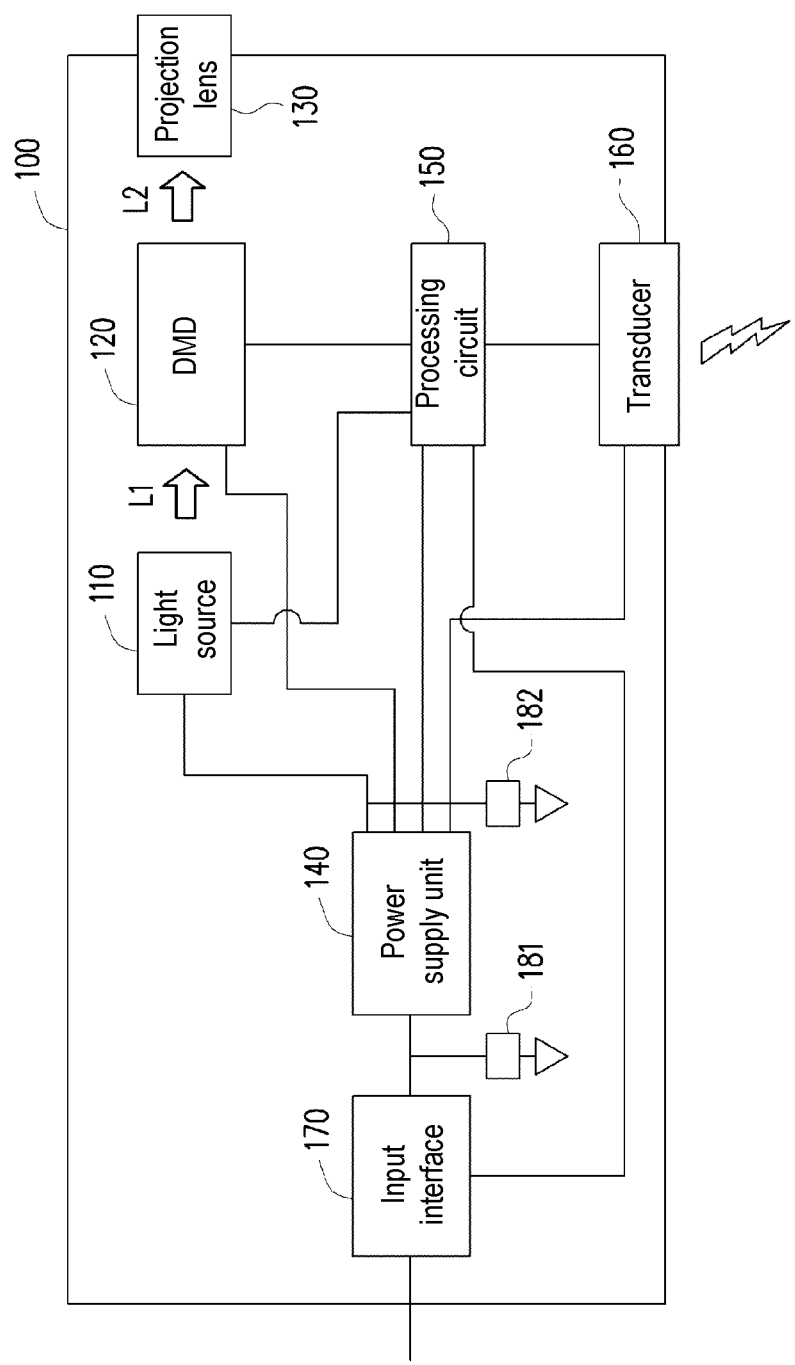
FIG. 4 is a block diagram of a pico projector according to another embodiment of the invention.

FIG. 4 is a block diagram of a pico projector 100 according to another embodiment of the invention. With reference to FIG. 4, the pico projector 100 may further include the input interface 170 for receiving an input voltage (e.g., 12V) provided by the vehicle when the door of the vehicle is opened and providing an output voltage to other elements of the pico projector 100. The input interface 170 is configured to receive information from the vehicle communication interface and may also include another interface, such as a CAN bus and/or a UART, to receive signals from the host of the vehicle. By modularizing the input interface 170, the pico projector 100 may easily access the hardware system of the existing vehicle. In addition, the interfaces such as the CAN bus and/or the UART may also communicate with the processing circuit 150 through the input interface 170, so as to transmit the data of the vehicle to the processing circuit 150.

Please refer to FIG. 4 again. In order to extend the time of discharging the input voltage and the output voltage of the power supply unit 140 (i.e., the time interval T1 during which the voltage is dropped to 4.3V from 12V and the time interval T2), a first capacitor 181 may be set corresponding to the input voltage of the power supply unit 140, and at least one second capacitor 182 may be set corresponding to a plurality of output voltages of the power supply unit 140. It will be understood by those skilled in the art that the pico projector 100 depicted in FIG. 1 incorporates the first capacitor 181 and at least one second capacitor 182 to form the pico projector 100 depicted in FIG. 4, so as to extend the time intervals T1 and T2. In one embodiment, the designer may select a larger capacitor depending on the actual requirements or may connect an additional capacitor in parallel to the pico projector 100, and the corresponding capacitance is 10 microfarads (μF) or more.

Figure 5:
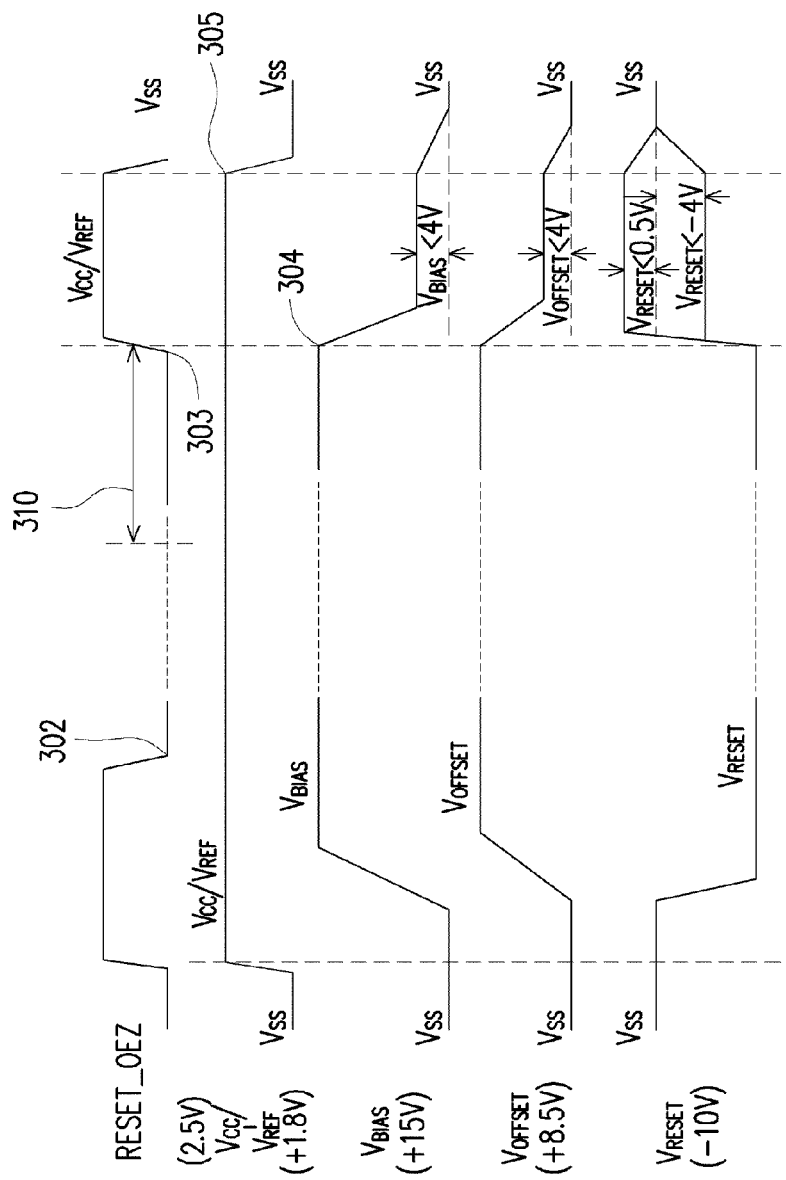
FIG. 5 is a voltage waveform diagram of a parking operation performed on a DMD according to an embodiment of the invention.

FIG. 5 is a voltage waveform diagram of a parking operation performed on a DMD 120 according to an embodiment of the invention. Please refer to FIG. 1, FIG. 3, and FIG. 5 at the same time. FIG. 5 shows the waveform diagram of RESET_OEZ, $V_{CC}/V_{REF}$, $V_{BIAS}$, $V_{OFFSET}$, and $V_{RESET}$ in the parking operation performed on the DMD 120, wherein rESET_OEZ is active low, which may actuate a driving circuit for internal resetting $V_{CC}/V_{REF}$, so as to provide power and potential to the controller/IC that controls the DMD 120; $V_{BIAS}$, $V_{OFFSET}$, and $V_{RESET}$ respectively serve as a positive bias level, a positive offset level, and a negative reset level for the MEMS that controls the DMD 120, respectively. The detailed descriptions and operations of the voltages may be found in the technical documentation DLPS076a provided by Texas Instruments. The above signals have been described in the previous paragraphs and therefore will not be described hereinafter. In particular, a second time point 302, a third time point 303, a fourth time point 304, and a fifth time point 305 respectively correspond to the start time point in the Second Step, the start time point in the Third Step, the start time point in the Fourth Step, and the start time point in the Fifth Step of performing the parking operation on the DMD 120. In particular, the Second Step includes a time interval 310 for performing the parking operation on the micromirror of the DMD 120. When the parking operation ends, the Third Step is started to notify the power supply unit 140 of cutting off the power provided to the DMD 120. Next, in the Fourth Step, i.e., after the fourth time point 304, $V_{BIAS}$, $V_{OFFSET}$, and $V_{RESET}$ are pulled down. Finally, after the fifth time point 305, the power supply unit 140 stops providing the output voltage.

In the Fifth Step, note that the central control system may, after issuing the shutdown warning signal, wait for the predetermined time interval and then cut off the input voltage supplied to the power supply unit 140 or the input interface 170.

To sum up, in the pico projector and the control method therefor as provided in one or more embodiments of the invention, when the shutdown warning signal is received, the parking signal is transmitted to the DMD of the pico projector, so as to perform the parking operation on the DMD. After the parking signal is transmitted, the power supply unit is notified of cutting off the power supplied to the DMD after the predetermined time interval, so that the DMD has sufficient time for the parking operation and is not easily damaged. The shutdown warning signal may be generated according to the transducer detecting that the door is being closed, may be generated according to the voltage attenuation of the input voltage of the pico projector greater than the predetermined percentage, or may be issued through the vehicle communication interface after the central control system of the vehicle determines that the door of the vehicle is closed. After receiving the shutdown warning signal, the pico projector may notify the power supply unit of cutting off the point power supplied to the light source of the pico projector source and/or the transducer to save power. In addition, the power supply unit of the pico projector may further include at least one capacitor corresponding to the input voltage and an output voltage. As such, the DMD has more time to complete the parking operation before the power is turned off, so as to avoid damages to the DMD.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the invention is provided to comply with the rules requiring an abstract, which will allow a searcher to quickly ascertain the subject matter of the technical invention of any patent issued from this invention. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the invention is intended to be dedicated to the public regardless of whether the element or component is explicitly recited in the following claims.

What is claimed is:

1. A pico projector, installed on a door of a vehicle and comprising:
   a light source, configured to provide an illumination beam,
   a digital micromirror device, disposed on a propagation path of the illumination beam and configured to convert the illumination beam to an image beam,
   a projection lens, disposed on a propagation path of the image beam and configured to project the image beam to the outside of the pico projector,
   a power supply unit, coupled to the light source and the digital micromirror device, and
   a processing circuit, coupled to the power supply unit and the digital micromirror device, wherein the processing circuit receives a shutdown warning signal, transmits a parking signal to the digital micromirror device to perform a parking operation on the digital micromirror device, and notifies the power supply unit of cutting off a first power supplied to the digital micromirror device after a predetermined time interval from transmitting the parking signal.

2. The pico projector according to claim 1, wherein the predetermined time interval is greater than one millisecond.

3. The pico projector according to claim 1, wherein after the processing circuit receives the shutdown warning signal, the power supply unit is notified of cutting off a second power supplied to the light source.

4. The pico projector according to claim 1, further comprising:
   a transducer, coupled to the processing circuit and the power supply unit, wherein when the transducer senses that the door of the vehicle is closing, the transducer transmits the shutdown warning signal to the processing circuit.

5. The pico projector according to claim 4, wherein after the processing circuit receives the shutdown warning signal, the power supply unit is notified of cutting off a third power supplied to the transducer.

6. The pico projector according to claim 4, the transducer comprising at least one of a distance transducer and an ambient light transducer.

7. The pico projector according to claim 1, wherein the processing circuit comprises a voltage detecting circuit configured to detect an input voltage of the power supply unit, and when a voltage attenuation of the input voltage is greater than a predetermined percentage, the voltage detecting circuit transmits the shutdown warning signal to the processing circuit.

8. The pico projector according to claim 1, the vehicle having a central control system configured to issue the shutdown warning signal to the processing circuit after the door of the vehicle is closed.

9. The pico projector according to claim 8, wherein the central control system supplies an input voltage to the power supply unit, and after issuing the shutdown warning signal, the central control system cuts off the input voltage supplied to the power supply unit after the predetermined time interval.

10. The pico projector according to claim 1, wherein the power supply unit receives an input voltage and outputs a plurality of output voltages, a first capacitor is set corresponding to the input voltage, and at least one second capacitor is set corresponding to the plurality of output voltages.

11. A control method for a pico projector, the pico projector being installed on a door of a vehicle and comprising a light source, a digital micromirror device, a projection lens, a power supply unit, and a processing circuit, the power supply unit being coupled to the light source, the digital micromirror device, and the processing circuit, the processing circuit being coupled to the digital micromirror device, the control method comprising:
   providing an illumination beam by the light source;
   converting the illumination beam to an image beam by the digital micromirror device disposed on a propagation path of the illumination beam;
   projecting the image beam to the outside of the pico projector by the projection lens disposed on a propagation path of the image beam; and
   receiving a shutdown warning signal by the processing circuit, transmitting a parking signal to the digital micromirror device to perform a parking operation on the digital micromirror device, and notifying the power supply unit of cutting off a first power supplied to the digital micromirror device after a predetermined time interval from transmitting the parking signal.

12. The control method according to claim 11, wherein the predetermined time interval is greater than one millisecond.

13. The control method according to claim 11, further comprising: after the processing circuit receives the shutdown warning signal, notifying the power supply unit of cutting off a second power supplied to the light source.

14. The control method according to claim 11, further comprising: a transducer coupled to the processing circuit and the power supply unit, the control method further comprising: transmitting the shutdown warning signal to the processing circuit by the transducer when the transducer senses that the door of the vehicle is closing.

15. The control method according to claim 14, further comprising: notifying the power supply unit of cutting off a third power supplied to the transducer after the processing circuit receives the shutdown warning signal.

16. The control method according to claim 11, wherein the processing circuit comprises a voltage detecting circuit configured to detect an input voltage of the power supply unit, and when a voltage attenuation of the input voltage is greater than a predetermined percentage, the voltage detecting circuit transmits the shutdown warning signal to the processing circuit.

17. The control method according to claim 11, wherein the vehicle has a central control system configured to issue the shutdown warning signal to the processing circuit after the door of the vehicle is closed.

18. The control method according to claim 17, further comprising: supplying an input voltage to the power supply unit by the central control system, and after issuing the shutdown warning signal, cutting off the input voltage supplied to the power supply unit after the predetermined time interval.

19. The control method according to claim 11, further comprising: receiving an input voltage and outputting a plurality of output voltages by the power supply unit, wherein a first capacitor is set corresponding to the input voltage, and at least one second capacitor is set corresponding to the plurality of output voltages.

* * * * *